United States Patent [19]
Metheny

[11] Patent Number: 5,145,201
[45] Date of Patent: Sep. 8, 1992

[54] VEHICULAR SNOW SKI

[75] Inventor: Kevin W. Metheny, Tippecanoe County, Ind.

[73] Assignee: Ultimate Sports Incorporated, West Lafayette, Ind.

[21] Appl. No.: 746,936

[22] Filed: Aug. 19, 1991

Related U.S. Application Data

[63] Continuation-in-part of Ser. No. 462,826, Jan. 10, 1990, Pat. No. 5,040,818.

[51] Int. Cl.⁵ .............................................. A63C 5/044
[52] U.S. Cl. .................................... 280/609; 280/21.1; 280/28; 280/602; 280/610
[58] Field of Search ............... 280/602, 601, 610, 845, 280/22, 28, 21.1

[56] References Cited

U.S. PATENT DOCUMENTS

| | | | |
|---|---|---|---|
| 2,038,077 | 4/1936 | Haglund | 280/609 |
| 3,732,939 | 5/1973 | Samson | 280/28 |
| 5,040,818 | 8/1991 | Metheny | 280/610 |

FOREIGN PATENT DOCUMENTS

| | | | |
|---|---|---|---|
| 828641 | 12/1969 | Canada | 280/28 |
| 1082772 | 4/1986 | Japan | 280/610 |

*Primary Examiner*—Eric D. Culbreth

[57] ABSTRACT

A vehicular snow ski is disclosed having an ultra high molecular weight polymer material for extended wear and an adjustable curvature tip end. The tip end is adjustable using a variable length turnbuckle for controlling the curvature and tension of the curved tip end. The radius of the curved tip end is changed to meet varying snow conditions encountered by an operator. The under side of the ski includes a plurality of concave surfaces extending longitudinally therealong for compacting snow and lifting the ski in the snow when moving therein. Two concave surfaces are recessed from a center concave surface to form two vertically oriented steering surfaces for controlling the direction of the ski in opposite directions. A wear bar with carbide inserts extends beyond the center concave surface for running on ice and other hard surfaces. Attached to the top surface is a shoe for mounting the ski to the suspension of a vehicle such as a snowmobile.

20 Claims, 2 Drawing Sheets

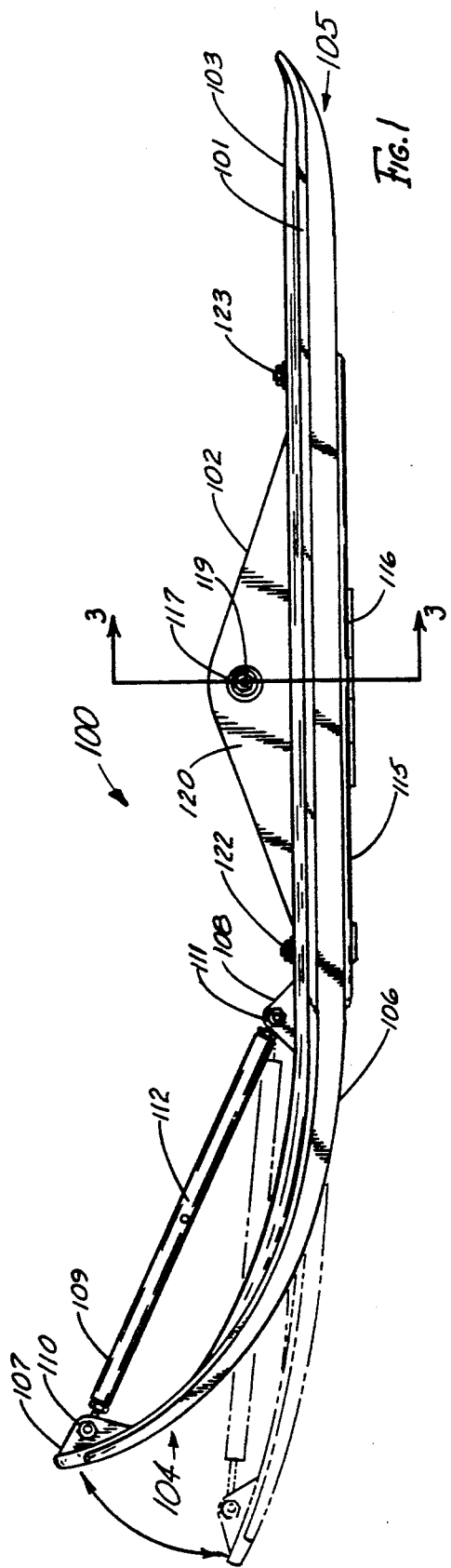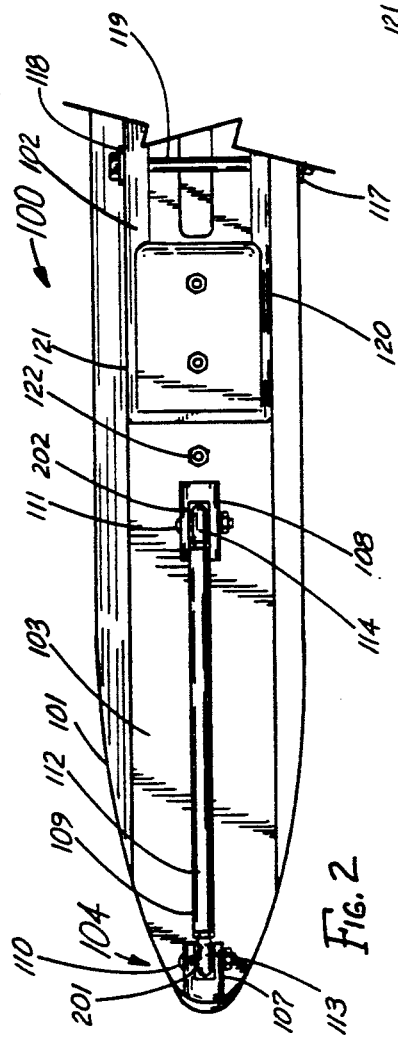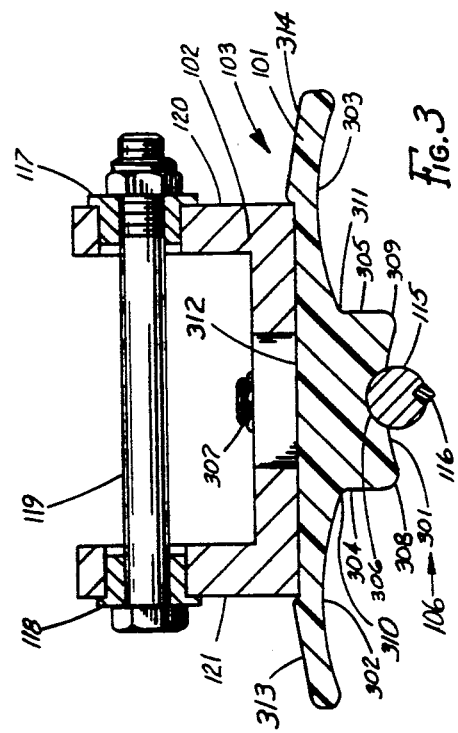

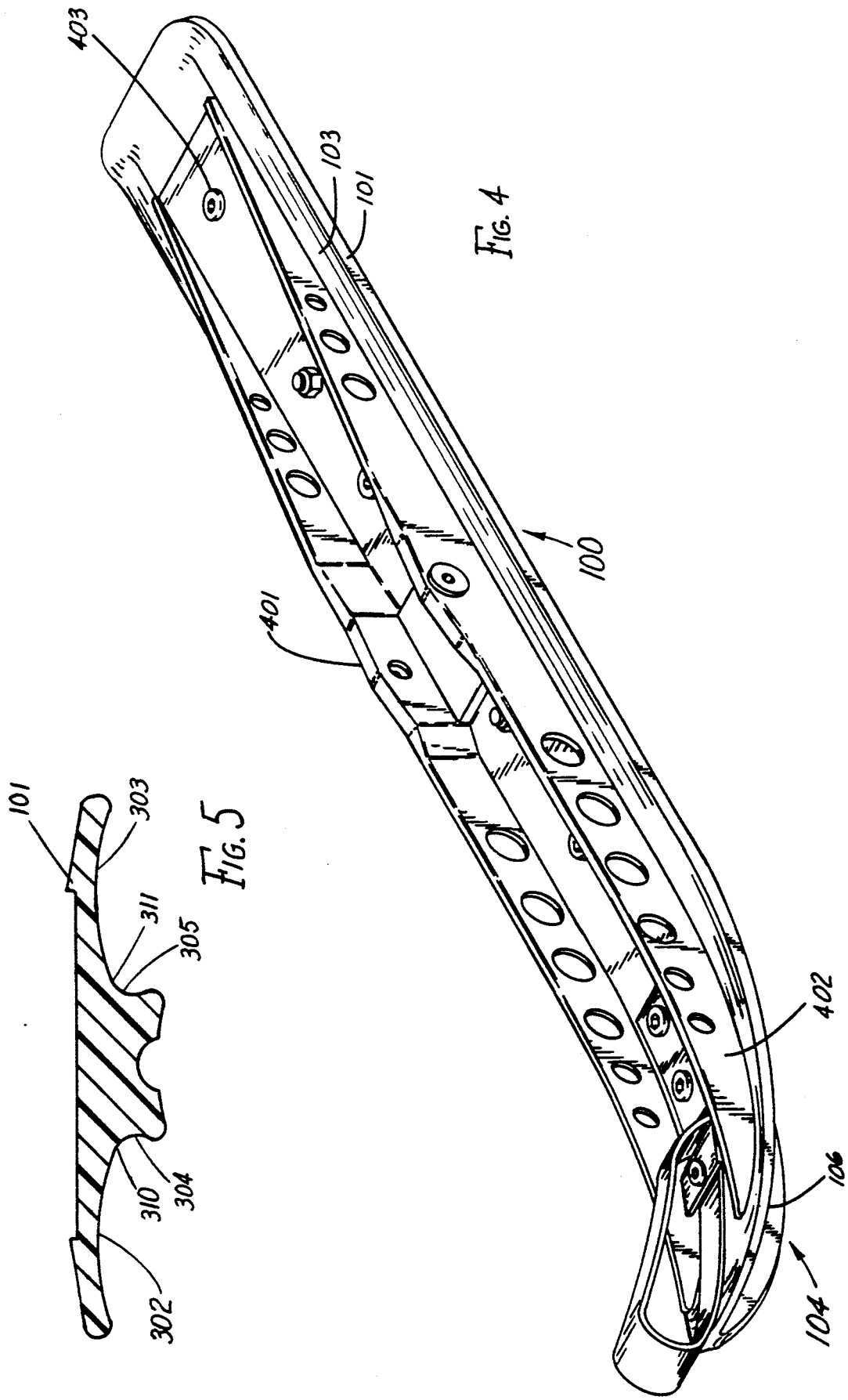

VEHICULAR SNOW SKI

CROSS-REFERENCE TO RELATED APPLICATIONS

This application is a continuation-in-part of application Ser. No. 07/462,826, filed Jan. 10, 1990, which will issue as U. S. Pat. No. 5,040,818, on Aug. 20, 1991.

TECHNICAL FIELD

This invention relates to snow skis and particularly to snow skis for use with a vehicle.

BACKGROUND OF THE INVENTION

Snow skis have been utilized for centuries on vehicles such as sleds and sleighs and more recently on all terrain vehicles, airplanes and snowmobiles. Snow skis have been made from materials such as wood, stone, metal and plastic. Presently, original equipment and aftermarket snowmobile skis are fabricated from crude steel or aluminum with painted or anodized finishes. Aluminum skis are lightweight but are not durable enough for all around trail riding. Steel is preferred for snowmobile skis because of manufacturing ease, low cost and short product life. Steel snowmobile skis wear quickly and last for only about 500–1000 miles with rust and corrosion appearing within the first 100 miles. Paint and powder coat finishes chip and flake off due to impact, vibration and abrasive contact. Snow is inherently filled with all types of debris such as rocks, gravel, sand, sticks and a considerable amount of salt due to operation along roadsides and on road surfaces. As the steel ski wears, the induced drag increases the roughness of the under surface with the ski plowing and churning its way through the snow. As a result, performance and fuel efficiency suffers tremendously not to mention the unattractive appearance of the ski.

Under certain snow conditions, the under surface of a snowmobile ski builds up frozen snow and ice thereon. With such an accumulation, the forward progress of the snowmobile is significantly impeded as a result of the increased resistance of the ski to slide over a snow covered surface. In some cases, the build up of snow and ice on the under surface of a snowmobile ski is so great that the forward progress of the vehicle is substantially prevented. One solution to this problem has been the use of a thin flexible strip of smooth plastic which is attached to the under surface of the snowmobile ski. The plastic does not support the buildup of frozen snow and ice and maintains the under surface of the ski free of snow and ice buildup. However, one problem associated with this solution is the rapid wear of the plastic strip. As a result, the plastic under surface strip is used only when temperature and snow conditions are encountered which promote the buildup of frozen snow and ice on the under surface of the snowmobile ski. Not only is the plastic strip subject to rapid wear, but the need for the operator to attach and remove the plastic strip depending on existing snow conditions is both time consuming and annoying.

Another problem associated with vehicular snow skis is the shape of the under surface. Present lateral construction of the under surface of the ski is flat which promotes wear of the under surface over rough terrains. The front end tip of the ski is curled with a fixed curvature for engaging the snow and setting the front suspension of the vehicle. With a fixed curvature, the suspension of the vehicle may be set for one type of snow condition such as shallow or dry hard packed snow but is not adapted for efficient use in deep snow where the progress of the vehicle may be seriously impeded. Typically, the curvature is set in a neutral position which is neither good or bad for any snow condition. However, this neutral position doe not provide an optimum setting particularly for high performance or competition applications.

With flat-bottomed snow skis, a longitudinally positioned steering or wear bar has been added to the under surface to provide directional steering of the ski. However, this bar wears as quickly, if not more so, than that of the under surface of the ski with loss of directional control as the steering bar is worn. The longitudinal under surface of the ski has also been formed into a convex or bowed shape to improve steerability, but again the wear at the center of the ski is significantly increased.

SUMMARY OF THE INVENTION

The foregoing problems and disadvantages are solved and a technical advantage is achieved in an illustrative vehicular snow ski having longitudinally extending under and steering surfaces, at least one of which is curved inwardly, that form a corner for advantageously compacting snow thereabout and turning the ski with significantly increased stability as it travels through snow. The corner is formed by the under surface facing downwardly and the steering surface facing laterally to one side of the ski and being positioned adjacently along the downwardly facing under surface. The under surface is also at least partially recessed from the steering surface, which then functions like a rudder. The inwardly curved or concave shape of at least one of the under and steering surfaces compacts snow, particularly in a lateral direction and against the steering surface, for advantageously turning the ski with significantly increased stability and control.

In one aspect, the under surface is curved inwardly or concave and is at least partially recessed from the steering surface to compact snow and lift the ski in the compacted snow as it travels in a forward direction. The corner compacts the snow even more thereabout and laterally against the steering surface. When the ski is turned, this laterally compacted snow against the steering surface advantageously turns the ski with increased stability and control.

To further increase snow compaction about the corner and steering surfaces, the steering surface is curved inwardly or concave.

The ski further includes a second corner formed by a second downwardly facing under surface and a second steering surface facing laterally to another side of the ski and positioned adjacently and longitudinally along the second under surface. At least one of the second under and steering surfaces is curved inwardly or concave. The second under surface is also at least partially recessed from the second steering surface. This second corner laterally compacts snow against the second steering surface for turning the ski in a second direction. To significantly increase the useful life and flexibility of the ski the elongated member is comprised of an ultra high molecular weight polymer material such as an ultra high molecular weight polyethylene material, which has been found experimentally to wear much better than steel. Not only does this material exhibit a better wear characteristic than that of steel but does not corrode or decompose in the presence of various chemicals such as road salts.

The ski further includes means, such as a shoe mounted or formed on the top surface thereof, for attaching the ski to a vehicle such as a snowmobile.

The ski also has a top surface with a middle and opposite side portions extending longitudinally therealong. The side portions are angled with respect to the middle to bite into overflowing snow when the ski is turning. These angled side portions further increase the stability and control of the ski while being turned.

The ski is also characterized as an elongated member having the aforementioned under and steering surfaces. Means such as a shoe are positioned about the top surface of the member for attaching the ski to a vehicle such as a snowmobile

BRIEF DESCRIPTION OF THE DRAWINGS

FIG. 1 depicts a side view of the vehicular snow ski of the present invention;

FIG. 2 depicts a top view of the tip end of the snow ski of FIG. 1;

FIG. 3 depicts a cross-sectional view of the ski of FIG. 1 along the line 3—3;

FIG. 4 depicts an alternative embodiment of the vehicular snow ski of FIG. 1; and FIG. 5 depicts a cross-sectional view of another aspect of the elongated member of the ski of FIG. 1.

DETAILED DESCRIPTION

Depicted in FIG. 1 is a side view of an illustrative snowmobile ski 100 including an elongated member 101 and a metallic shoe 102 mounted on the top surface 103 of the elongated member for attaching the ski to a vehicle such as a snowmobile. The elongated member is comprised of an ultra high molecular weight polymer material such as TIVAR-100 ultra high molecular weight polyethylene material which is available from the Poly-Hi Menasha Corporation, Fort Wayne, IN. This ultra high molecular weight polymer material has been found to wear four to five times better than steel.

The elongated member 101 has a leading tip end 104 with an adjustable curvature, a trailing back end 105 and an under side 106 for running in snow and on other surfaces such as ice and the like. Turnbuckle 109 determines the curvature of the tip end. The overall length of the turnbuckle is adjustable by the rotation of center member 112 for variably changing the curvature of the tip end between a fully upright position as shown and a larger radius relaxed position as indicated by the phantom lines of the tip end. Depicted in FIG. 2 is a top view of tip end 104 of the snowmobile ski. As shown in FIGS. 1 and 2, lugs 107 and 108 are positioned on the top surface 103 of the elongated member along a center line thereof. Lug 107 is positioned forward at the curved tip end, whereas second lug 108 is positioned rearward therefrom in front of shoe 102. These lugs are formed with respective slots 201 and 202 in the molding process of the elongated member. The ends of turnbuckle 109 are inserted in the slots and attached between the two lugs using well-known bolts 110 and 111, respectively. The length of turnbuckle 109 is adjusted by turning center member 112 either clockwise or counter clockwise with respect to the right and left hand threaded eye bolts 113 and 114. Adjusting the overall length of the turnbuckle changes the predetermined curvature of the tip end between the fully upright and relaxed positions.

In the relaxed position, the turnbuckle is extended to its longest length for establishing the largest radius curvature of the tip end. This large radius curvature of the tip end allows the ski to run faster in shallow and wet snow. In the fully upright position, the length of turnbuckle 109 has been adjusted to its shortest length for establishing a shorter radius curvature. This shorter radius curvature causes the tip end 104 of the ski to become more vertical. In addition, the tension of the tip end is greater and provides less flex in the suspension of the vehicle. With the curved tip end of the ski in a more vertical position, the tip end more readily lifts the snowmobile when running in deep or powdery snow. The adjustment of the turnbuckle allows the operator to readily adjust and fine tune the suspension of his vehicle according to prevailing snow conditions. This is particularly useful when competing in sport or competition events. The combination of the concave surfaces of the under surface of the ski along with the adjustable tip end allow the operator to transfer large amounts of weight to the back end of the sled or snowmobile for better traction while maintaining easy and surefooted control of the vehicle. In addition, the tracking and directional control is improved significantly along with safer operation of the snowmobile.

Mounted on the top surface 103 of the elongated member just back of second lug 108 is show 102. Shoe 102 is a generally U-shaped metallic channel configured as shown with holes drilled in the upwardly extending sides 120 and 121 of the channel for receiving bushings 117 and 118 a connector bolt 119 therein for connecting the ski to the suspension of a snowmobile.

A stainless steel wear bar 115 is mounted on the under side 106 of elongated member 101 centrally and longitudinally therealong with a plurality of studs and nuts such as 122 and 123. A plurality of carbide inserts 116 are attached to the downwardly extending surface of the wear bar for making contact with ice and other surfaces for controlling the direction of the ski thereon.

Depicted in FIG. 3 is a cross sectional view of the ski of FIG. 1 along the line 3—3. The under side 106 of elongated member 101 comprises three inwardly curved or concave surfaces 301-303. Concave under surface 301 extends longitudinally and centrally along the under side of the elongated member. Second and third inwardly curved or concave surfaces 302 and 303 also extend longitudinally along the under side 106 of the elongated member lateral to concave under surface 301 and recessed therefrom as shown. These longitudinal concave surfaces compact the snow as the ski moves along therein and lifts the ski in the snow as the ski travels therein. Under side 106 also includes steering surfaces 304 and 305 which extend vertically between the middle concave surface 301 and the two adjacently positioned concave under surfaces 302 and 303. Steering surface 304 extends between concave under surface 301 and 302 and is utilized as a thrust surface for changing the direction of the ski in one direction. Steering surface 305 extends between concave surface 301 and 303 is similarly used as a thrust surface for changing the direction of the ski as it moves in snow in a second direction generally opposing that of the first direction.

Inwardly curved or concave under surface 302 and steering surface 304 form a corner 310 for compacting snow thereabout and turning the ski in one direction. Under surface 302 compacts the snow in a downward direction and lifts the ski as it travels in a forward direction through the compacted snow. However, the snow is compacted even more about corner 310 due to the presence of steering surface 304. This more compacted snow has a lateral component of which steering surface 304 engages as the ski is turned. As a result, the ski turns with much better stability and control. Inwardly curved or concave surface 302 is at least partially recessed from steering surface 304, which functions like a rudder when turned. Laterally facing steering surface 304 is positioned adjacent and longitudinally along the length of the ski to form corner 310. A second corner 311 is formed by downwardly facing under surface 303 and laterally facing steering surface 305, which are similarly positioned like surfaces 302 and 304, for compacting snow and turning the ski in a second direction.

Top surface 103 includes middle portion 312 and opposite side portions 313 and 314 positioned adjacent middle portion 312. Side portions 313 and 314 are each angled, as shown, with respect to middle portion 312 for biting into overflowing snow as the ski is turned.

Extending longitudinally in first concave surface 301 is semi-circular surface 306 for receiving stainless steel wear bar 115. Stainless steel wear bar 115 is mounted to the elongated member with a plurality studs extending vertically through the ultra high molecular weight polyethylene material to the top surface 103 of the member. Fasteners again such as nut 307 fixedly positioned the wear bar and shoe 102 to the elongated member. Wear bar 115 extends downwardly from concave under surface 301 for making contact on surfaces other than snow such as ice and the like. The plurality of carbide inserts 116 extend downwardly from the wear bar for providing a pointed contact surface for reducing friction and wear on these hardened surfaces. Edges 308 and 309 formed by steering surface 304 and 305 and concave under surface 301 are utilized for providing a pointed contact surface for running on softer surfaces such as mud and dirt.

Depicted in FIG. 4 is a pictorial view of snowmobile ski 100 with shoe 401 which is an alternative embodiment of shoe 102. In this embodiment, the elongated member 101 of the ski has had lugs 107 and 108 removed. Shoe 401 is also a generally U-shaped metallic channel extending almost the entire length of the top surface 103 of the elongated member. The extended channel reinforces the elongated member and has a curved tip end 402 for establishing a predetermined curvature to the tip end 104 of the elongated member. The shoe, also commonly referred to as a strongback, is cast from a metal material such as ALMAG 35 to form the desired U-shaped channel and the curvature at the tip end. The shoe is attached to the elongated member using a plurality of fasteners such as buttonhead x-socket cap screws 403 along with the studs and self-locking nuts from the wear bar attached to the under surface 106 of the elongated member. Although not as adjustable as the first embodiment a far as varying snow or surface conditions are concerned, the reinforced structure of the elongated member provides significant durability in heavy-duty utility applications.

FIG. 5 depicts a cross sectional view of another aspect of elongated member 101 of the ski of FIG. 1. In this aspect, steering surfaces 304 and 305 are curved inwardly or concave to further compact snow in a lateral direction when the ski is turned. Corners 310 and 311 compact snow as previously described when the ski is turned; however, concave steering surfaces further compact the snow in lateral a direction to provide even more stability and control when the ski is turned. It is contemplated that under surfaces 302 and 303 are inwardly curved or concave or, alternatively, generally flat. Although, at least one of the under and steering surfaces be inwardly curved or concave for snow compaction about corner 310.

A ski can move at speeds in excess of 150 m.p.h. through a liquid. Regardless of whether the liquid is a viscous material such as water or semiviscous material such as snow, basic rules of hydrodynamics come into play. Metal skis to date are very crude and do not interact with the surface with which they pass over or through. The "T" section design utilized by many of these skis functions like a plow. The ski sinks into the snow allowing the snow to fold over the top of the ski causing great amounts of drag and loss of directional control and stability. Enormous amounts of weight are also picked up with added snow, slush, ice and debris. The idea of creating a planing effect with "T" section steel skis is to make them wider. Skis over one foot wide for greater planing in powder dry snow are known. However, unnecessary weight is added to these skis.

Snow is one of the most difficult materials to understand. It can range in density from near ice to powder dry consistency. An infinite variety of particle sizes are also possible ranging from microscopic to large clumps. Snow changes rapidly and what was powder dry an hour ago may be like concrete the next hour depending on variable outside conditions such as wind, temperature, additional snow, rain or sunshine. A one cubic foot section of snow can have many layers of different types of snow. All kinds of debris can also be found such as rocks, sticks, concrete, steel, dirt, etc.

The ski of the present invention at speeds of 10 to 15 m.p.h., with an initial snowmobile front end weight load of between 100 to 400 lbs., comes to the snow surface and planes out thus eliminating unseen layers of varying snow inconsistencies and debris. Utilizing the ski of the present invention with a cross section of not more than 5.5 inches in width in even powder dry snow of reasonable density makes this possible without the need for extra unneeded ski width.

FIG. 3 depicts the ski of the present invention in its simplest form with two concave under surfaces 302 and 303 facing downward on either side of extended under surface 30 with two laterally facing flat steering surfaces 304 and 305, all of which run the entire length of the ski. The horizontal concave under surfaces serve to compact the snow and direct it cleanly from the front to the rear of the ski as the ski passes over the surface. Snow is trapped under the ski at the same time creating lift and not allowing large amounts of snow to surround the ski and get on top of it producing large amounts of induced drag. By keeping the ski on the surface of the snow, many different types of layers of snow and debris such as rocks and limbs are avoided while still maintaining a high degree of stability. In addition to the high planing and compaction qualities developed by concave under surfaces 302 and 303, these concave surfaces also serve to feed high density snow to flat laterally facing steering surfaces 304 and 305. These steering surfaces are like those of a rudder. As a high density snow is fed to the smaller radiused corners of the rudder extremely high density snow is produced by a venturi effect about corners 310 and 311 of the rudder. It is important to note these corners are radiused instead of sharp 90 degree corners. Sharp 90 degree corners disrupt flow and cause cavitation resulting in turbulence and, ultimately, loss of stability. Smooth flow and compaction of snow are preferred.

Tests were run on the skis of the present invention versus conventional steel "T" section skis. Two factory stock Ski Doo Formula Mach 1 snowmobiles were used. One snowmobile had the factory wide stock 5.3 inch wide skis and the other used the 5.5 inches wide ski of the present invention. Both types of skis were nearly the same length of 42 inches. Temperature was 28 degrees F. with fresh snow on an already groomed trail with a hard pack base of between 2" and 4" in depth. Fresh snow was of a dry to slightly damp consistency depending on areas of bright sunlight to shade. The trail was 4 miles in length by odometer reading with corners ranging from 20 to 90 degrees. A flat trail was selected so that severe up and down grades of 10 degrees or more were eliminated. Four riders were used to eliminate variables in riding proficiency. A total of eight runs per sled were made with each rider switching snowmobiles at the end of each four mile run and riding the opposite snowmobile back to the two riders waiting. Each rider was instructed to maintain a minimum speed of 20 m.p.h. and a maximum speed of 60 m.p.h. Previous test runs indicated that these speeds could be maintained without variables such as spinning or sliding the track of the snowmobile or any other variable not attributed to the skis. Each rider carried a stop watch and left starting points two minutes apart so that no rider would be influenced by the other.

Run times for the stock skis ranged from 6 minutes 4.27 seconds to 6 minutes 41.32 seconds with an average time of 6 minutes 19.69 seconds. Run times for the skis of the present invention ranged from 5 minutes 22.84 seconds to 5 minutes 56.08 seconds with an average time of 5 minutes 34.84 seconds. The highest and lowest times were not included in the stated and average times. Results indicate that a snowmobile using the skis of the present invention achieved a much better elapsed time through a set course than a similarly prepared snowmobile using steel skis with conventional "T" section design. Overall results of this test indicate that the skis of the present invention maintained an overall proficiency rating of 13.7% better than "T" section designed steel skis.

A second test was also conducted on the same day under the same conditions as before through a corner on the previous used course. The corner had an approximate radius of 20 feet with a flat, well-groomed, 20 foot wide trail leading into the corner. The corner was open to direct sunlight and the consistency of the snow was dry to semi-damp approximately 4 inches deep over 2 to 6 inches of hard pack underneath. The same snowmobiles were used as before with the same four riders. Four runs were made at the corner with each snowmobile alternating runs therethrough. With a few test runs at the corner it was decided a speed of 20 m.p.h. was the optimum speed to go around the corner without getting too much over steer from the track sliding around. Cornering was placed entirely on the skis, and the snowmobiles were not pitched side ways to get a racing angle on the corner. In all four runs by each snowmobile, the snowmobile equipped with the skis of the present invention held a much tighter turning radius with little to no understeer or front end drift. The snowmobile equipped with skis of the present invention held a consistent line, while the conventional steel skied snowmobile consistently required all of the existing trail to maintain 20 m.p.h. through the corner. The conventional steel skied snowmobile also banked off the outside burm of the corner. Conventional skis averaged an 85 foot radius through the 20 foot radius turn of the 20 foot wide course. The skis of the present invention with flat steering surfaces averaged an 81 foot radius, while the skis of the present invention with concave steering surfaces averaged a 78 foot radius.

It is to be understood that the above-described vehicular snow ski is merely an illustrative embodiment of the principles of this invention and the numerous other vehicular snow skis may be devised by those skilled in the art without departing from the spirit and scope of the invention. In particular, the elongated member may be formed of other ultra high molecular weight materials which are flexible and wear better than steel. The curvature of the curved tip end of the ski may also be varied by other variable length or tension assemblies for adjusting the curvature of the curved tip end. The length and shape of the shoe may also be varied to accommodate various sport or utility applications.

What is claimed is:

1. A vehicular snow ski comprising:
   a first under surface facing downwardly and extending longitudinally therealong; and
   a first steering surface facing laterally to one side of said ski, extending adjacently and longitudinally along said first under surface, and forming with said first under surface a first corner curved inwardly for compacting snow thereabout and turning said ski in a first direction, at least one of said under and steering surfaces being curved inwardly, said first under surface being at least partially recessed from said first steering surface.

2. The ski of claim 1 wherein said under surface is inwardly curved and said steering surface is generally flat.

3. The ski of claim 1 wherein said under and steering surfaces are both curved inwardly.

4. The ski of claim 1 wherein said under surface is generally flat and said steering surface is curved inwardly.

5. The ski of claim 1 further comprising a second under surface facing downwardly and extending longitudinally therealong;
   and a second steering surface facing laterally to another side of said ski, extending adjacently and longitudinally along said second under surface, and forming with said second under surface a second corner curved inwardly for compacting snow hereabout and turning said ski in a second direction, at least one of said second under and steering surface being curved inwardly, said second under surface being at least partially recessed form said second steering surface.

6. The ski of claim 5 wherein said ski includes mean for attaching said ski to a vehicle.

7. The ski of claim 5 comprising an ultra high molecular weight polymer material.

8. The ski of claim 5 wherein said first and second under surfaces are concave and said first and second steering surfaces are generally flat.

9. The ski of claim wherein said under and steering surfaces are all concave.

10. The ski of claim 5 wherein said under surfaces are both generally flat and said steering surfaces are concave.

11. The ski of claim 1 further comprising a flexible material.

12. The ski of claim 1 further comprising a top surface having a middle portion and a first side portion extending longitudinally therealong, said first side portion being angled with respect to said middle portion.

13. The ski of claim 12 further comprising a second side portion extending longitudinally therealong and being angled with respect to said middle portion.

14. A snow ski for use with a vehicle comprising:
elongated means having a first concave under surface facing downwardly and extending longitudinally therealong an a first steering surface facing laterally to one side of said elongated means, extending adjacently and longitudinally along said first concave surface, and forming with said first concave surface a first concave corner for compacting snow thereabout and turning said ski in a first direction; and means positioned about a top surface of said elongated means for attaching said ski to said vehicle.

15. The ski of claim 14 wherein said first concave under surface is at least partially recessed from said first steering surface.

16. The ski of claim 14 wherein said elongated means further comprises a second concave under surface facing downwardly and extending longitudinally therealong for compacting snow and lifting said ski in said snow and a second steering surface facing laterally to another side of said elongated means, extending adjacently and longitudinally along said second concave under surface, and forming with said second concave under surface a second concave corner for compacting snow thereabout and turing said ski in a second direction.

17. The ski of claim 16 wherein said first and second concave under surfaces are at least partially recessed from said first and second steering surfaces, respectively.

18. The ski of claim 17 wherein said steering surfaces are concave.

19. The ski of claim 18 further comprising an ultra high molecular weight polymer material.

20. A snowmobile ski comprising:
a flexible, ultra high molecular weight polyethylene material;

first and second concave, under surfaces facing downwardly and extending longitudinally therealong;

first and second generally flat, steering surfaces facing laterally to respective first and second sides of said ski, extending adjacently and longitudinally along said first and second concave, under surfaces, respectively, and forming respectively with said first and second under surfaces respective first and second corners for compacting snow thereabout and turning said ski in respective first and second directions, said first and second under surfaces being at least partially recessed from said first and second steering surfaces, respectively;

a top surface having a middle portion and first and second side portions extending longitudinally therealong and both being angled with respect to said middle portion; and means positioned about said top surface for attaching said ski to a snowmobile.

* * * * *